June 6, 1950  H. RINIA  2,510,521
OPTICAL SYSTEM
Filed April 18, 1946
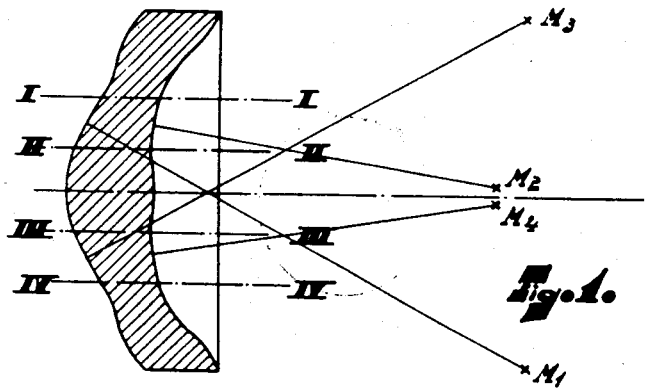
Fig. 1.
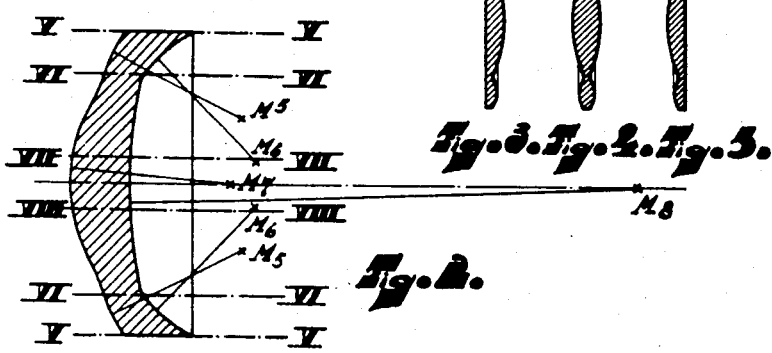
Fig. 3. Fig. 2. Fig. 5.
Fig. 2.
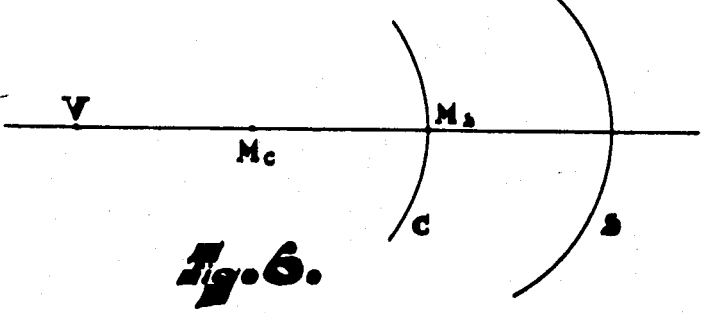
Fig. 6.
INVENTOR.
HERRE RINIA
BY
ATTORNEY.

Patented June 6, 1950

2,510,521

UNITED STATES PATENT OFFICE 2,510,521

OPTICAL SYSTEM

Herre Rinia, Eindhoven, Netherlands, assignor, by mesne assignments, to Hartford National Bank and Trust Company, Hartford, Conn., as trustee Application April 18, 1946, Serial No. 662,965
In the Netherlands May 26, 1941

Section 1, Public Law 690, August 8, 1946
Patent expires May 26, 1961

3 Claims. (Cl. 88—57)

This invention relates to optical systems. More particularly this invention relates to known optical systems of the kind comprising a correcting element having at least one aspherical surface, for example for neutralizing aberration occurring in the system. Thus, for example the so-called Schmidt's camera (described in "Lunettes et Télescopes," Danjon et Couder, page 254) comprises a correcting element for neutralizing the spherical aberration caused by the spherical mirror used in this system.

Apart, however, from the spherical aberration other faults occur, in an optical system which contribute to the image being improperly defined. Apart from the so-called first-order faults, which can be compensated by sharp adjustment of the image surface, these faults generally depend on higher powers of the opening angle of the system and of the image angle. If in the system the opening angle is large and the image angle is comparatively small the faults in which the opening angle occurs to a higher power will generally be more serious than those in which the image angle occurs to a higher power. The faults of higher order which depend on the opening angle or on the image angle exhibit only terms of odd degree.

As far as the monochromatic third order faults are concerned five of them may be distinguished in which it is, at least primarily, of especial importance for the accurate representation of a body that those terms in which the opening angle of the system occurs up to the third and second powers, the so-called spherical aberration, may be eliminated by a correcting element of the kind used by Schmidt. A "correcting element" is to be understood to mean an element the paraxial magnification of which is zero or only very slight and, by reason of this slight power, contributes at the most only to a slight extent to the optical magnification of the system and serves substantially to neutralize an aberration of the system. In Schmidt's camera a similar element serves for the removal of the spherical aberration. That third-order fault in the system in which the opening angle occurs to the second order and the image angle to the first power is the so-called coma. In given systems this third-order coma does not occur at all in the absence of spherical aberration when the optical system concerned satisfies the so-called sinusoidal condition, as may be the case, for example, in Schmidt's camera.

In respect of the faults of fifth and higher order that may occur in an optical system the following will be observed. In this case also the faults in which the opening angle occurs to a higher power, assuming a large opening angle and a comparatively small image angle generally play a more important part than those faults in which the image angle occurs to a higher power.

The spherical aberration of the fifth order may be removed by means of the correcting element hereinbefore described for the third-order spherical aberration. The fifth and/or higher order coma however, continues, troublesome to a greater or less extent. It disappears when the optical system concerned satisfies the so-called sinusoidal condition. In some systems, apart from ninth and higher order coma, fifth-order coma does not occur, but seventh-order coma does, in other systems, however, it is essentially the fifth-order coma which is troublesome.

The invention has for its object to provide means whereby in optical systems the fifth and/or higher order coma of the system is neutralized, at least in part, in a simple manner. According to the invention, for this purpose the said correcting element is bent. A "bent correcting element" in the sense of the invention is to be understood to mean a correcting element in which the two optically operative circumscribing surfaces of the element comprise one or more regions which are oppositely arranged, calculated in the axial direction of the element, and whose centers of curvature are located at a finite distance from and on the same side of the correcting element.

In order that the invention may be clearly understood and readily carried into effect it will now be described more fully with reference to the accompanying drawing, in which Figs. 1 and 2 show two constructional examples of correcting elements according to the invention.

Figures 3, 4, and 5 are typical examples of the manner in which correcting elements may have been constructed before my invention. Figure 6 is a schematic illustration of a mirror system constructed in accordance with the invention.

Figures 1 and 2 show correcting elements whose paraxial magnification is shown for the sake of clearness on a very widely enlarged scale. Fig. 1 shows that the correcting element illustrated comprises, between the lines designated I—I, II—II and also between the lines III—III and IV—IV, regions which are located on the two optically operating circumscribing surfaces, which regions, calculated in the axial direction of the element, are oppositely arranged and comply with the definition hereinbefore given of being "bent" in the sense of the invention. Indeed, the regions between the lines I—I and II—II of the circumscribing surfaces have curvature centres $M_1$ and $M_2$ which are located at a finite distance and on the same side of the correcting element, and this remark also applies to the curvature centres $M_3$ and $M_4$ of the regions of the two circumscribing surfaces which are located between the lines III—III and IV—IV.

In the form of construction shown in Fig. 2 these regions of the two circumscribing surfaces of the correcting element shown therein, which are arranged between the lines V—V and VI—VI and between VII—VII and VIII—VIII also comply with the said condition, as follows from the arrangement of the centers of curvature $M_5$ and $M_6$ and from that of the centers of curvature $M_7$ and $M_8$.

For the sake of comparison with the forms of construction of the correcting element according to the invention, Figs. 3, 4 and 5 show forms of construction of known correcting elements which consequently have not the property of neutralising a fifth and/or higher order coma occurring in an optical system and resulting from the sinusoidal condition. Indeed, in the constructional form shown in Figs. 3 and 5 the left hand and the right hand circumscribing surface respectively of these correcting elements is completely plane so that the center of curvature of these parts is located at infinity. An intermediate form between the possibilities shown in Figs. 3 and 5 is shown in Fig. 4, the centers of curvature of each pair of arbitrarily chosen regions, oppositely arranged in the axial direction of the element, of the optically operative circumscribing surfaces of the element being located on different sides of the correcting element.

According to the invention, it has been found that for example due to the spherical bending of a correcting element comprising one or more fourth-degree optically-operative circumscribing surfaces the fifth-order coma of a system in which such an element is used can be neutralised. If even then third-order coma should remain it can be neutralised by a small axial displacement of the element. Similarly, for compensating a seventh-order coma of a system a correcting element comprising one or more fourth-degree optically-operative circumscribing surfaces may be bent according to the fourth degree. Should even then fifth-order coma remain, it can be compensated by a superposition of a spherical bending on the said fourth-degree bending. Generally therefore, according to the invention, a given degree coma can be neutralised by a correcting element comprising fourth-degree optically-operative circumscribing surfaces being bent according to a curve of a degree which is by three orders lower than the coma to be removed.

In some systems, for the purpose of obtaining the desired effect, the correcting element already included in the system for another reason may be bent. Thus, for example, in the Schmidt's camera the element already mentioned for the removal of the spherical aberration may be bent in this manner. In other systems, for example in a triplet, a specially bent correcting element may be provided for the purpose of removing the fifth and/or higher order coma. This may therefore, in some cases by suitably shaping the circumscribing surfaces, remove the spherical aberration of the system which is still present at least for the major part.

In Schmidt's camera, when the object's distance is infinitely large, fifth-order coma does generally not occur, but seventh order coma does, in some cases also third order coma and according to the invention in this case the seventh order coma is compensated for by suitably bending the correcting element. If the correcting element is suitably shaped and arranged, the third order coma may be used for wholly or partially compensating other faults of the system, the presence of third order coma being thus an advantage more than a disadvantage.

If a Schmidt's camera is intended for reproducing a body arranged at finite distance from the system, fifth-order coma generally occurs and, according to the invention, may be compensated at least in part by so choosing the radius of curvature of the substantially spherically bent correcting element that this radius is at least one quarter and at the most three quarters of the distance between the body and the correcting element. In the use of a thin correcting element the best results are obtained if the value of this radius of curvature is equal to half the distance between the body and the correcting element. The fifth-order coma which occurs in this case and which may be harmful to the optical properties of such a system is thus compensated.

Fig. 6 shows such an arrangement of Schmidt's camera. The body to be represented is arranged at V. The spherical mirror included in the system is designated S. The center of curvature of the mirror S is at $M_s$. As is the practice in Schmidt's cameras, the correcting element C is arranged so as to contain the center of curvature $M_s$ of the mirror S. In contradistinction to the usual arrangements, for the purpose of obtaining the effect above indicated, the correcting element C which for the sake of simplicity is indicated here by a line is spherically bent in accordance with the invention, its center of curvature being located at $M_c$. The position of $M_c$ is such that the distance between V and $M_c$ is equal to that between $M_c$ and $M_s$. The figure shows that the convex side of the correcting element C is turned towards the hollow side of the mirror S, as is essential for the obtainment of the desired effect.

What I claim is:

1. An optical system comprising a concave mirror and a correcting plate for spherical aberration and coma of said optical system, an object to be reproduced spaced a finite distance from said system, said correcting plate having two refractive axially displaced zonal surface portions concave in the same sense as said mirror, said zonal portions having surface variations the radii and centers of curvature of which correspond to substantially half the distance between said correcting element and said object whereby the centers of curvature of said zonal portions are displaced to positions correcting for a coma of higher order than the third order.

2. An optical system comprising a concave mirror and a correcting plate for spherical aberration and coma of said optical system, an object to be reproduced spaced a finite distance from said system, said correcting plate having two refractive axially displaced zonal surface portions concave in the same sense as said mirror, said zonal portions having surface variations the radii and centers of curvature of which correspond to at least one quarter and at most three-quarters of the distance that the object is spaced from said correcting plate whereby the centers of curvature of said zonal portions are spaced from the positions of the centers of curvature of said element thereby correcting for a coma of higher order than the third order.

3. An optical system comprising a concave mirror and a correcting plate for spherical aberration and coma of said optical system, an object to be reproduced spaced a finite distance from said system, said correcting plate having two refractive axially displaced zonal surface portions concave in the same sense as said mirror, said zonal portions having surface variations the radii and centers of curvature of which are equal to substantially one-half of the distance between said correcting element and said object, said concave mirror being spaced from said plate a distance equal to about one-half that between said plate and said object, whereby the coma of a higher order than the third is corrected.

HERRE RINIA.

REFERENCES CITED

The following references are of record in the file of this patent:

UNITED STATES PATENTS

| Number | Name | Date |
| --- | --- | --- |
| 934,579 | Straubel et al. | Sept. 21, 1909 |
| 2,170,979 | Straubel | Aug. 29, 1939 |
| 2,273,801 | Landis | Feb. 17, 1942 |
| 2,298,808 | Ramberg | Oct. 13, 1942 |
| 2,332,930 | Rinia | Oct. 26, 1943 |
| 2,377,268 | Rinia | May 29, 1945 |
| 2,409,971 | Bennett | Oct. 22, 1946 |